(12) United States Patent
Locke et al.

(10) Patent No.: US 7,059,609 B1
(45) Date of Patent: Jun. 13, 2006

(54) METAL GASKET WITH COLD FORMED STOPPER

(75) Inventors: Edward James Locke, Bolingbrook; James Roman Zwick, Lemont, both of IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 1140 days.

(21) Appl. No.: 09/592,969

(22) Filed: Jun. 13, 2000

(51) Int. Cl.
*F02F 11/00* (2006.01)

(52) U.S. Cl. .................... 277/593; 277/594; 277/598; 29/888.3

(58) Field of Classification Search ............. 277/591, 277/593, 594, 597–9, 601, 611, 654; 29/888.3
See application file for complete search history.

(56) References Cited

U.S. PATENT DOCUMENTS

| | | |
|---|---|---|
| 3,567,234 A | 3/1971 | Skrycki |
| 4,836,562 A | 6/1989 | Yoshino |
| 5,054,795 A | 10/1991 | Udagawa et al. |
| 5,209,504 A | 5/1993 | Udagawa et al. |
| 5,213,345 A | 5/1993 | Udagawa et al. |
| 5,240,261 A | 8/1993 | Udagawa et al. |
| 5,240,262 A | 8/1993 | Udagawa et al. |
| 5,451,063 A | 9/1995 | Udagawa et al. |
| 5,522,604 A | 6/1996 | Weiss et al. |
| 5,542,683 A | 8/1996 | Papendorf et al. |
| 5,582,415 A | 12/1996 | Yoshida et al. |
| 5,618,049 A | 4/1997 | Ueta |
| 5,713,580 A | 2/1998 | Ueta |
| 5,873,577 A | 2/1999 | Inamura |
| 5,931,475 A | 8/1999 | Yamada |

*Primary Examiner*—Anthony Knight
*Assistant Examiner*—Alison K. Pickard
(74) *Attorney, Agent, or Firm*—Reising, Ethington, Barnes, Kisselle, Learman & McCulloch, P.C.

(57) ABSTRACT

A multilayer metal gasket has a pair of outer active layers separated by an intermediate layer. The outer active layers are formed with at least one pair of aligned apertures and sealing beads surrounding the apertures in radially outwardly spaced relation thereto presenting laterally opposed sealing surfaces of the active layers of predetermined spacing or thickness when the gasket is in a compressed free state. The intermediate layer extends radially inwardly beyond the apertures and is provided with a cold formed stopper portion having a thickness greater than the combined material thicknesses of the intermediate layer and outer active layers but less than the thickness of the sealing beads. The stopper portion is cold formed under a compressive load exceeding the compressive load required to deform the sealing beads beyond their elastic limit, thereby preventing irreversible damage to the sealing beads. The stopper portion presents opposing sealing surfaces which, when the gasket is clamped between two members having a passage to be sealed, serves as a primary seal or fire dam, shielding the sealing beads of the outer active layers from direct exposure to the heat of any fluid in the passage, such as hot exhaust gases of an internal combustion engine.

18 Claims, 2 Drawing Sheets

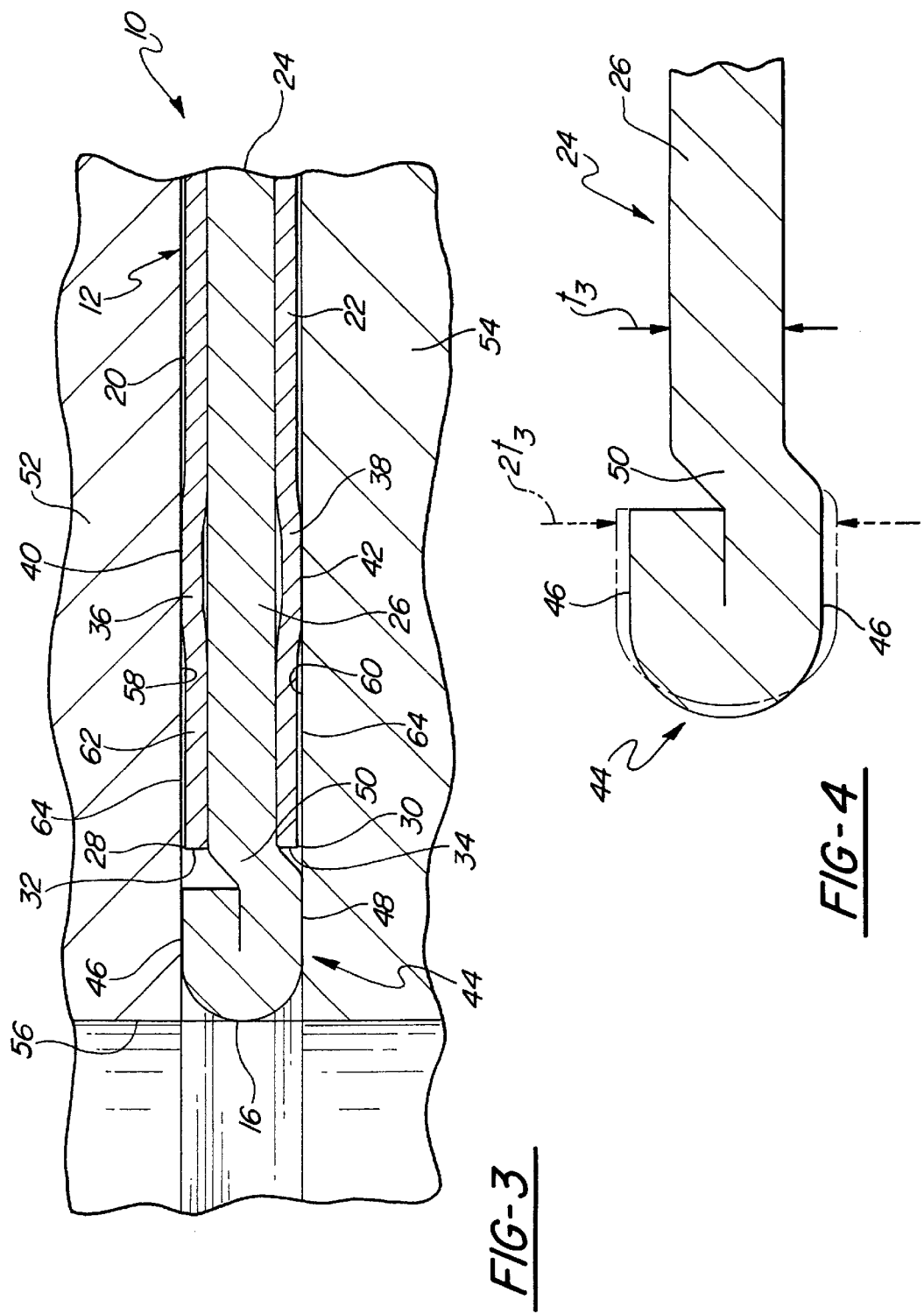

METAL GASKET WITH COLD FORMED STOPPER

BACKGROUND OF THE INVENTION

1. Technical Field

This invention relates to multilayer metal gaskets for use in internal combustion engines and the like.

2. Related Prior Art

Multilayer metal gaskets find many uses in internal combustion engine applications as a means of sealing a fluid passage communicating between two components or members which are bolted together. Examples include gaskets used to seal the numerous passages between a head and block of an engine and those used to seal the passages between an exhaust manifold and the block through which hot gases pass from the combustion chambers into the manifold.

Some applications call for a metal gasket of a three-layer configuration, including a pair of outer active layers which are fabricated of a resilient metal material, such as high alloy steels, separated by an intermediate layer. Typically, the outer active layers are formed with at least one set of lined apertures defining an opening in the gasket surrounded by at least one sealing bead formed as an annular deformation in each of the outer active layers. The sealing bead presents outer sealing surfaces which contact and seal against the mating surfaces of the two bolted members. As the two members are drawn together during assembly, the sealing beads are compressed elastically under load, providing fluid-tight sealing engagement between the sealing surfaces of the outer layers and the mating surfaces of the two members being sealed. The intermediate metal layer is formed with an aperture aligned with the apertures of the outer active layers, having a thickened annular stopper portion or ring surrounding such aperture and presenting upper and lower stopper surfaces surrounding the opening which are in contact with or are engageable with the inner surfaces of the active layers. The thickness of the stopper layer together with the material thickness of the active layers in contact with the stopper layer define a theoretical maximum closing of the gap between the members, and hence a maximum limit of deformation of the resilient sealing beads. The function of the stack of material layers in the stopper region is to prevent over compression of the sealing beads beyond the elastic limit which would cause irrecoverable plastic deformation of the sealing beads and hence damage to the gasket.

If the manufacture and installation of the gasket is not carefully controlled, variations in material thicknesses and/or excessive loading on installation and use can cause over compression of the sealing bead beyond its elastic limit. Particularly in exhaust manifold gasket applications, the sealing surfaces of the outer active layers are exposed to the extremely hot exhaust gases passing through the sealed opening from the block to the exhaust manifold. Prolonged exposure of the outer active layers to such hot exhaust gases can deteriorate the elastic properties of the outer active layers by effectively softening the material and impairing their sealing capabilities.

Gaskets used in such environments are also subjected to extreme thermal cycling and high thermal loads as the gaskets are exposed to repeated hot and cold engine conditions. Under hot engine conditions, the expansion of the bolted members can impart additional compressive loads on the gasket, exceeding the compressive yield strength of the stopper portion of the gasket, that can lead to a condition know as "thermal crush" in which the sealing beads of the outer active layers are further compressed beyond their designed elastic limit, leading to permanent, irreversible plastic deformation of the sealing beads, impairing the sealing capabilities of the gasket.

A gasket constructed according to the invention overcomes or greatly minimizes the foregoing limitations associated with such prior multilayer metal gaskets.

SUMMARY OF THE INVENTION AND ADVANTAGES

A multilayer metal gasket constructed according to the invention of the type installable between opposing members having at least one fluid passage communicating therebetween which is to be sealed against leakage, comprises outer active layers and an intermediate stopper layer. The outer active layers are fabricated of elastic metal plate material of predetermined material thickness having at least one set of aligned apertures formed therein for surrounding the passage of the members. The outer active layers have at least one set of sealing beads surrounding their respective aligned apertures and including laterally opposed outer sealing surfaces engageable with opposing surfaces of the members about the fluid passage of the members. The bead embossments are elastically deformable under a predetermined compressive load exerted by the members for supporting and maintaining the sealing surfaces of the active layers in sealing engagement with the opposing surfaces of the members about the fluid passage. The bead embossments have a known maximum compressive load.

The intermediate metallic layer has a base portion of predetermined material thickness disposed between the outer active layers in operative contacting relation therewith to define a pre-compressed spacing between the laterally opposed sealing surfaces of the outer active layers. The intermediate layer includes an annular stopper portion disposed radially inwardly of the apertures of the active layers defining an opening for alignment with the passage of the members. The stopper portion further presents a pair of laterally opposed sealing surfaces which surround the opening and are unobstructed (i.e. do not underlie) the outer active layers. The stopper portion is cold formed to a thickness exceeding the combined material thicknesses of the outer active layers and the base portion of the intermediate layer, but less than the pre-compressed lateral spacing between the sealing surfaces of the outer active layers. The stopper portion has a predetermined cold-formed compressive strength that is greater than the maximum compression load capacity of the bead embossments of the outer active layers.

The fully exposed cold-formed stopper layer has the advantage of defining, with certainty, the maximum load capacity of the gasket below which only elastic deformation of the sealing beads is permitted, protecting the gasket against overloading and/or thermal crush of the sealing beads. By cold forming the stopper under a load exceeding the maximum load capacity of the sealing beads of the outer active layers, and doing so while achieving a thickness of the stopper portion which is greater than the combined material thicknesses of the outer active layers and the base portion of the intermediate layer, but less than the spacing between the sealing surfaces of the outer active layers, the outer active layers are protected against overloading. For any given application, the initial cold forming load used to form the stopper portion can be set at or far above the clamping load and thermal crush load imparted to the gasket during normal or extreme operation thereby to assure that the outer active layers are protected against irreversible damage from overloading.

Another advantage of the present invention is that the exposed sealing surfaces of the stopper define the first or primary seal about the passage of the members, thus serving as a fire dam ahead of the outer active embossed layers to protect the outer active layers from direct exposure to hot exhaust gases, pressures, or the like passing through the passage of the members. This insulating effect of the stopper portion isolates the sealing beads and sealing surfaces of the outer active layers against direct exposure to any hot gases in the passages, and guards against heat-induced softening or relaxation of the elastic properties of the outer active layers, assuring maintained, undiminished sealing performance of the gasket.

According to a preferred aspect of the invention, the cold-formed stopper portion of the intermediate layer is preferably made by folding the stopper layer back upon itself and cold forming the material under a predetermined compressive load to reduce the stopper layer portion to a thickness less than twice the material thickness of the base portion of the intermediate layer and greater than the combined material thicknesses of the base portion and outer active layers, but less than the pre-compressed spacing of the outer sealing surfaces of the outer active layers. A multilayer gasket formed in such way has the same advantages discussed above.

BRIEF DESCRIPTION OF THE DRAWINGS

These and other features and advantages of the present invention will become more readily appreciated when considered in connection with the following detailed description and appended drawings, wherein:

FIG. 3 is a view like FIG. 2 but showing the gasket clamped in operation between two opposing members; and FIG. 4 is an enlarged cross-sectional view of the intermediate layer.

DETAILED DESCRIPTION

Figure 1:
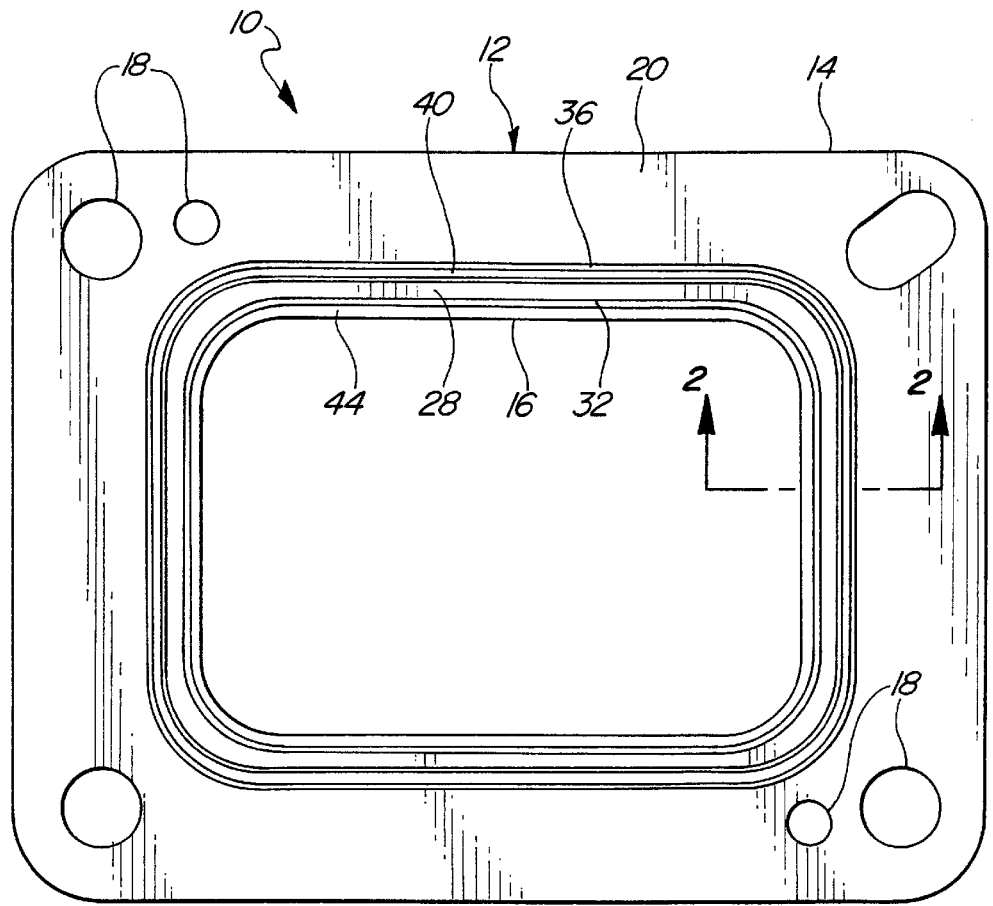
FIG. 1 is a plan view of a gasket constructed according to the invention.

A multilayer metal gasket and in the illustrated embodiment in exhaust manifold gasket constructed according to the invention is shown generally at 10 in FIG. 1 and has a multilayer body 12 with an outer perimeter 14 and an inner perimeter defining at least one opening 16 through the gasket body 12. The gasket body 12 may include additional openings 18 for accommodating fastening bolts, alignment pins, and the like which are conventional to gaskets.

Figure 2:
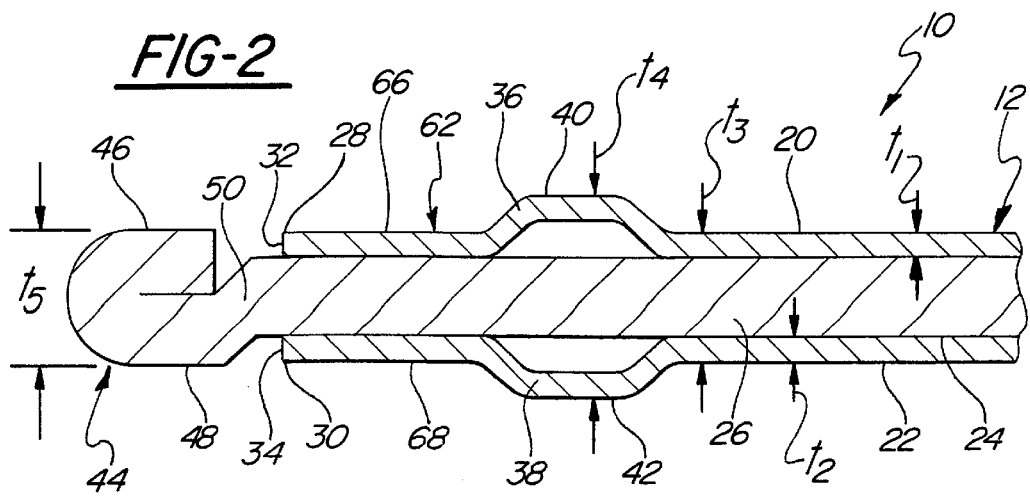
FIG. 2 is a fragmentary cross-sectional view taken generally along lines 2–2 of FIG. 1.

FIG. 2 shows further details of the construction of the gasket 10. The multilayer body 12 includes outer active layers 20,22 which are fabricated of elastic metal plate material, such as stainless steel or other metal.

Between the outer active layers 20,22 is an intermediate layer 24. This layer 24 has a base portion 26 of predetermined thickness $t_3$ that is disposed between the upper 20 and lower 22 active layers and is in operative contact therewith. Of course, it is contemplated that the various layers may or may not have coatings applied thereon (not shown for clarity), such that the base portion 26 may contact the active layers 20,22 through an intervening coating or coatings so as to be an operative contact therewith.

It will be seen from FIG. 2 that the thickness $t_3$ of the base portion 26 of the intermediate layer 24 is considerably greater than the material thicknesses of the outer active layers 20,22.

Still referring to FIG. 2, it will be seen that the outer active layers of the preferred embodiment are generally flush with and in contact with the base portion 26 of the intermediate layer 24. The outer active layers 20,22 are formed with a pair of aligned apertures 28,30 defined by inner peripheral edges 32,34 of the active layers 20,22 respectively. The outer active layers 20,22 are each formed with a sealing bead formation or embossment 36,38 that is annular or circumferentially continuous and encircles the respective apertures 28,30 in radially outwardly spaced relation thereto. The sealing beads 36,38 project from the general plane of the respective active layers 20,22. In the embodiment shown, the active layers 20,22 are oriented relative to the intermediate layer 24 such that the spring stiffness will accommodate the available load/stiffness provided by to joint while achieving the desired sealing contact stress. As also shown in FIG. 2, the sealing beads 36,38 are aligned with one another on opposite sides of the intermediate layer 24. The beads 36,38 may be formed in any convenient manner which, according to present practice, is achieved by pressing the ridge-like embossments into the active layer materials 20,22. The formation of the sealing beads 36,38 presents laterally outer sealing surfaces 40,42 which are laterally spaced from the intermediate layer 24. However in some cases these layers may be offset given the appropriate thickness in layer 24. The sealing surfaces 40,42, in their free, uncompressed condition, are spaced apart by a distance or effective thickness $t_4$. The effective sealing surface thickness $t_4$ of the active layers 20,22 will, of course, vary depending upon the particular application.

The intermediate layer 24 includes an annular (or circumferentially continuous) stopper portion 44 projecting radially inwardly of the base portion 26 in radially inwardly spaced relation to the edges 32,34 of the apertures 28,30 of the active layers 20,22. The stopper portion 44 has the characteristic of being cold worked or formed (i.e., mechanically worked at a temperature low enough to avoid tempering and relief of the induced strain hardening effects of the imparted plastic deformation) so as to thicken the intermediate layer 24 at the stopper portion 44 to a thickness $t_5$ exceeding the combined stack up of material thicknesses of the active and intermediate layers (i.e., $t_5 > t_1 + t_2 + t_3$). The cold formation may be carried out at room temperature without any subsequent heat treatment which would act to relieve the induced strain hardening. The stopper portion thickness $t_5$ is less than the uncompressed thickness $t_4$ between the sealing surfaces 40,42 of the outer active layers 20,22. The strain-induced hardness of the stopper portion 44 is greater than the hardness base portion 26.

The thickened stopper portion 44 presents laterally opposed sealing surfaces 46,48 that are spaced laterally inwardly of the apertures 28,30 and thus are fully exposed across their entire surface such that neither of the active layers 20,22 overlies or encumbers the stopper portion sealing surfaces 46,48.

While there are various ways to cold form the stopper portion of the intermediate layer 24 to achieve the desired thickness and imparted work hardening compressive strength, to bend the intermediate layer 24 out of its plane at 50 and fold the laterally inward region back upon itself to provide an initial double thickness (i.e., $2 \times t_3$) of the stopper layer. Following the folding of the intermediate layer 24, the doubled over stopper portion 44 is mechanically, plastically deformed under a predetermined compressive load in order to reduce the thickness of the stopper portion 44 from the initial thickness of the $2 \times t_3$ to the desired thickness $t_5$. The inner perimeter of the stopper portion 44 defines the opening 10 in the gasket associated with a passage 56 of the members 52,54 to be sealed. The cold formed stopper portion 44 thus has a thickness $t_5$ less than twice the material thickness $t_3$ of the base portion 26 of the intermediate layer 24. The above cold formed reduction of the stopper portion 44 is illustrated in FIG. 4, wherein the initial doubled over, double thickness intermediate layer 24 is shown in broken chain lines, and the cold formed reduction to the thickness $t_5$ shown in solid lines. The arrangement of the bend 50 and reduction of the doubled over stopper portion 44 is such as to locate the sealing surfaces 46,48 equally with respect to a center plane of the intermediate layer 24, so as to project equally above and below the base portion 26 of the intermediate layer 24.

The apertures 28,30 of the outer active layers 20,22 are relatively larger in size than the dimension of the bend 50 such that the edges 32,34 of the apertures 28,30 are spaced laterally outwardly of the bend region 50 when the gasket is in the uncompressed free state as illustrated in FIG. 2.

Referring now additionally to FIG. 3, the gasket is shown installed between adjoining members 52,54, such as an exhaust manifold and block, respectively, of an internal combustion engine. The members 52,54 have an aligned passage 56 through which a fluid flows between the members 52,54 (i.e., hot exhaust gases). The gasket 10 seals the passage 56 at the interface of the members 52,54 against leakage.

The gasket 10 is installed by positioning the gasket between the members 52,54 as shown, with the opening 16 and sealing beads 36,38 surrounding the passage 56. The sealing surfaces 40,42 of the outer active layers 20,22 contact the opposing faces 58,60 of the members 52,54 to be sealed. Clamping the members 52,54 toward one another compresses the sealing beads 36,38 elastically until the faces 58,60 of the members 52,54 confront the sealing surfaces 46,48 of the stopper portion 44. At this point, no further deformation (elastic or plastic) of the sealing beads 36,38 is permitted. According to the invention, the stopper portion 44 is cold formed under a compressive load that exceeds the load required to plastically deform (and thus damage) the sealing beads 36,38 of the outer active layers. In practice, the stopper portion 44 is cold formed under a compressive load that exceeds the maximum clamping pressure and the maximum compressive loads due to thermal cycling which could be expected to be encountered in a given application as imparted by the members 52,54 on the gasket 10. In this way, the stopper portion 44 intervenes to positively prevent overloading of the sealing beads 36,38 beyond their designed elastic limit. The cold-formed stopper 44 thus by itself reacts between the members 52,54 to absolutely limit and fix the amount of compression of the active layers on full clamp up of the members 52,54. There is no concern of overloading the sealing beads 36,38 due to overtightening mounting bolts. By cold forming the stopper portion 44 to withstand such loads and more before deforming further, the stopper portion 44 standardizes the load applied to such gaskets for a given application. It will be appreciated that the loads applied by the members will vary among different applications. The relative dimensions of the gasket layers and cold-formed load capacity of the stopper layer 44 is equally applicable. For a given application, the amount of desired gasket compression and maximum compression load from clamping and thermal cycling is determined. This governs the thicknesses of the gasket layers and cold-forming compression load applied to form the stopper portion 44, as above, to produce a gasket according to the invention. This ensures that the compression load on the gasket in service does not exceed the predetermined maximum load capacity of the sealing beads 36,38, beyond which they could be subjected to possible irreversible plastic deformation.

Still referring to FIG. 3, it will be seen that the stopper portion 44, when the gasket 10 is installed and fully clamped between the members 52,54, serves as a primary seal about the passage 56, with the sealing surfaces 46,48 supported in sealing engagement with the faces 58,60 of the members 52,54.

The outer active layers are spaced radially outwardly of the stopper portion 44 and thus are shielded by the stopper portion 44 from direct contact with the hot gases passing through the passage 56 of the members 52,54. The stopper portion 44, in effect, acts as a fire dam to the outer active layers 20,22, protecting the sealing beads 36,38 from excessive heat and possible loss of elastic properties that could result therefrom. A transition region 62 between the stopper portion 44 and sealing beads 36,38 lies at a level below the sealing surfaces 40,42 and 46,48 of the outer active layers and stopper portion, respectively, having inner surfaces in contact with the base portion 26 providing an air gap 64 when fully clamped between the members 52,54 further insolating the sealing beads 36,38 and the sealing surfaces 40,42 from exposure to the hot gases on the radially inward side of the stopper portion 44.

In the preferred embodiment illustrated in the drawings, the sealing surfaces 46,48 of the stopper portion 44 extend above outer surfaces of the active layers 20,22 in the transition region 62.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A multilayer metal gasket installable between opposing members having at least one fluid passage communicating therebetween which is to be sealed against leakage, said gasket comprising:

outer active layers fabricated of elastic metal plate material of predetermined material thickness and having at least one set of aligned apertures therein for surrounding the fluid passage, said active layers having at least one set of sealing bead formations surrounding said aligned apertures and including laterally opposed outer sealing surfaces of the outer active layers engageable with opposing surfaces of the members about the fluid passage, said sealing beads being elastically deformable under a predetermined compressive load exerted by the members for supporting said sealing surfaces of said active layers into sealing engagement with the members about its passage, said sealing beads having a predetermined maximum compressive load capacity beyond which said beads are subject to overcompression and permanent plastic deformation;

an intermediate metallic layer having a base portion of predetermined thickness disposed between said active layers in contacting relation therewith and defining a precompressed spacing between said sealing surfaces of said active layers; and said intermediate layer including a stopper portion disposed radially inwardly of said apertures in said active layers defining an opening for alignment with the passage of the members and laterally opposed sealing surfaces surrounding said opening and unobstructed by said active layers, said stopper portion being cold formed to a thickness greater than the combined material thicknesses of said active and said base portion of said intermediate layer but less than said pre-compressed spacing of said sealing surfaces of said active layers and having an imparted cold-formed compressive strength exceeding said maximum compressive load capacity of said sealing beads of said active layers rendering said stopper portion incompressible during installation and operation of said gasket and thereby enabling said compressive elastic deformation of said sealing beads to achieve the desired sealing of the passage while precluding overcompression and possible damage of said beads.

2. The gasket of claim 1 wherein said stopper portion comprises a cold-formed folded over section of said intermediate layer.

3. The gasket of claim 2 wherein said thickness of said folded over stopper portion is less than twice said material thickness of said base portion of said intermediate layer.

4. The gasket of claim 3 wherein said sealing surfaces of said stopper portion protrude equally above and below opposing surfaces of said base portion of said intermediate layer.

5. The gasket of claim 4 wherein said material thickness of said intermediate layer is greater than said material thickness of each of said active layers.

6. The gasket of claim 1 wherein said material thickness of said intermediate layer is greater than said material thickness of each of said active layers.

7. The gasket of claim 1 wherein said stopper portion serves as a primary seal about the passage when installed between the members insulating said sealing beads and their associated sealing surfaces of said active layers from direct exposure to hot gases flowing through the passage.

8. The gasket of claim 7 wherein the gasket comprises an exhaust manifold gasket of an internal combustion engine.

9. The gasket of claim 1 wherein said sealing beads project outwardly of one another away from said base portion of said intermediate layer.

10. The gasket of claim 9 including transition regions of said active layers disposed radially inwardly of said sealing beads having inner surfaces thereof contacting said base portion of said intermediate layer and outer surfaces spaced laterally inwardly of said sealing surfaces of said stopper portion.

11. The gasket of claim 10 wherein said material thickness of said intermediate layer is greater than said material thickness of each of said active layers.

12. A multilayer metal gasket installable between opposing members having at least one fluid passage communicating therebetween which is to be sealed against leakage, said gasket comprising:

outer active layers fabricated of elastic metal plate material of predetermined material thickness and having at least one set of aligned apertures therein for surrounding the fluid passage, said active layers having at least one set of sealing bead formations surrounding said aligned apertures and including laterally opposed outer sealing surfaces of said outer active layers engageable with opposing surfaces of the members about the fluid passage, said sealing beads being elastically deformable under a predetermined compressive load exerted by the members for supporting said sealing surfaces of said active layers into sealing engagement with the members about its passage, said sealing beads having a predetermined maximum load capacity beyond which said beads are subject to overcompression and permanent plastic deformation;

an intermediate metallic layer having a base portion of predetermined thickness disposed between said active layers in contacting relation therewith and defining a pre-compressed spacing between said sealing surfaces of said active layers; and said intermediate layer including a folded over stopper portion having a radially inner edge defining an opening for alignment with the passage of the members and a radially outer edge spaced radially inwardly of said apertures of said active layers presenting laterally opposed sealing surfaces surrounding said opening in such manner as to be unobstructed by said active layers for direct sealing engagement with the members about the passage, said folded over stopper portion being cold formed to provide a reduced thickness of said folded over stopper portion less than twice said material thickness of said intermediate layer and less than the pre-compressed spacing of said sealing surfaces of said active layers and an induced compressive strength exceeding said maximum compressive load rating of said sealing beads thereby rendering said folded over stopper portion incompressible during installation and operation of said gasket enabling said compressive elastic deformation of said sealing beads to achieve the desired sealing of the passage while precluding overcompression and possible damage of said beads.

13. The gasket of claim 12 wherein said sealing surfaces of said folded over stopper portion protrude equally above and below opposing surfaces of said base portion of said intermediate layer.

14. The gasket of claim 12 wherein said material thickness of said intermediate layer is greater than said material thickness of each of said active layers.

15. The gasket of claim 12 wherein each of said active layers includes a transition region lying between said sealing beads and said aligned apertures having inner surfaces thereof contacting said base portion of said intermediate layer and outer surfaces spaced laterally inwardly of said sealing surfaces of said folded over stopper portion.

16. The gasket of claim 15 wherein said sealing beads project laterally away from one another outwardly of said base portion.

17. A method of making a multilayer metal gasket installable between opposing members having at least one fluid passage communicating therebetween which is to be sealed against leakage, said gasket comprising:

providing laterally opposed active layers fabricated from elastic metal plate material of predetermined material thickness and having at least one set of aligned apertures formed therein for surrounding the fluid passage of the members;

forming at least one set of elastically compressible sealing beads in the active layers surrounding the apertures and having a predetermined maximum compressive load capacity, below which the bead embossments deform elastically under load to support the sealing surfaces of the active layers in sealing engagement with the members during normal installation and operation of the gasket and above which the beads are subject to overcompression and permanent plastic deformation;

providing an intermediate metallic layer having a base portion of predetermined material thickness;

cold forming the intermediate layer material to provide a stopper portion having an inner edge defining an opening and an outer edge sized radially smaller than the aligned apertures;

arranging the intermediate layer between the active layers with the base portion supporting the sealing surfaces of the active layers at a pre-compressed spacing and with the stopper portion spaced radially inwardly of the aligned apertures to present axially opposed sealing surfaces of the stopper portion unobstructed by the active layers;

and wherein the cold formation of the stopper portion imparts a thickness to the stopper portion that exceeds the combined material thicknesses of the base portion of said intermediate layer and each of the active layers but is less than the pre-compressed spacing of the sealing surfaces of the active layers, and further work hardens the material to induce a compressive strength to the stopper portion that exceeds the maximum compressive load rating of the sealing beads to thereby render the stopper portion incompressible during normal installation and operation of the gasket enabling the sealing beads to undergo elastic deformation to achieve the desire sealing while precluding overcompression and possible plastic deformation of the beads.

18. The method of claim 17 wherein the cold formation of the stopper portion includes folding over the intermediate layer material and plastically compressing the folded over region to reduce its thickness to less than twice the material thickness of the base portion of the intermediate layer under a compressive load exceeding that which the gasket would encounter during normal installation and operation to provide a strain-induced hardness and compression load capacity exceeding the compressive load capacity of the sealing beads.

* * * * *

UNITED STATES PATENT AND TRADEMARK OFFICE
CERTIFICATE OF CORRECTION

| | |
|---|---|
| PATENT NO. | : 7,059,609 B1 |
| APPLICATION NO. | : 09/592969 |
| DATED | : June 13, 2006 |
| INVENTOR(S) | : Edward James Locke and James Roman Zwick |

It is certified that error appears in the above-identified patent and that said Letters Patent is hereby corrected as shown below:

| Column | Line | |
|---|---|---|
| 8 | 3 | Replace "maximum load capacity" with -- maximum compressive load capacity-- |

Signed and Sealed this

Twenty-eighth Day of November, 2006

JON W. DUDAS
*Director of the United States Patent and Trademark Office*